United States Patent [19]
Blumenthal et al.

[11] 3,751,295
[45] Aug. 7, 1973

[54] PLASMA ARC SPRAYED MODIFIED ALUMINA HIGH EMITTANCE COATINGS FOR NOBLE METALS

[75] Inventors: Jack L. Blumenthal, Los Angeles; David F. Carroll, Torrance; John R. Ogren, La Palma, all of Calif.

[73] Assignee: The United States Atomic Energy Commission, Washington, D.C.

[22] Filed: Nov. 5, 1970

[21] Appl. No.: 87,055

Related U.S. Application Data

[63] Continuation-in-part of Ser. No. 695,796, Jan. 4, 1968.

[52] U.S. Cl.............. 117/227, 29/198, 29/199, 117/27, 117/93.1 PF, 117/217, 117/221, 161/225, 165/133
[51] Int. Cl............. C23c 3/04, C23c 7/00
[58] Field of Search............ 117/93.1 PF, 201, 117/221, 227, 217, 27; 29/195, 198, 199; 161/225; 165/133 X; 252/466, 514, 519, 520

[56] References Cited
UNITED STATES PATENTS 2,946,829  7/1960  Likins et al. ............... 252/466 PT
2,948,672  8/1960  Brennan .................... 252/466 PT
2,965,564  12/1960 Kirshenbaum et al. ...... 252/466 PT
3,183,337  5/1965  Winzeller et al. .......... 117/93.1 PF Primary Examiner—Alfred L. Leavitt
Assistant Examiner—J. H. Newsome
Attorney—Roland A. Anderson

[57] ABSTRACT

A method of applying a controlled emittance to a noble metal selected from the group including ruthenium, rhodium, palladium, osmium, iridium and platinum, and intra-alloys thereof. The coating is applied by plasma arc spraying modified alumina on a surface of one of the noble metals group, the alumina being modified by having a hydrochloric acid washed alumina powder contain a dispersion of a noble metal black selected from the above group.

A cladding of one of the group of noble metals above, having a layer of plasma arc sprayed modified alumina bonded on at least one surface thereof, the alumina being modified as indicated in the above method.

1 Claim, 3 Drawing Figures

PATENTED AUG 7 1973 3,751,295

David F. Carroll
Jack L. Blumenthal
John R. Ogren
*INVENTORS*

PLASMA ARC SPRAYED MODIFIED ALUMINA HIGH EMITTANCE COATINGS FOR NOBLE METALS

BACKGROUND OF THE INVENTION

This is a continuation-in-part of application Ser. No. 695,796, filed Jan. 4, 1968.

Controlling the surface emittance of radioisotope containment vessels for aerospace applications has been a problem in the prior art. This problem has been particularly severe in view of safety requirements which are that no release of the radioactive contents be allowed under any conceivable situation, that is, both normal operation and all abnormal modes of operation, including abort modes. The most probable situation involves exposure of a fuel vessel to terrestial gases, such as air or water vapor and carbon dioxide, at elevated temperatures of up to 2,500° F for an extended period of time measured in years. The survivability of the vessel in this situation depends strongly upon the surface temperature of the vessel which can be lowered to an acceptable level by the use of a high emittance coating according to the invention.

Containment material for radioisotope vessels should include a refractory metal strength member clad with a noble metal. The refractory metals usually include vanadium, niobium (columbium), tantalum, chromium, molybdenum, tungsten and rhenium. The refractory metal provides high temperature (1,600° F) creep strength, and the noble metal provides protection from the rapid, high temperature oxidation that a bare refractory metal container would incur. The noble metal cladding has a disadvantage and this is its low emissivity, about 0.2. Hemispherical total emissivity, $E_{ht}$, is the ratio of the radiancy (rate of emission of radiant energy from a unit area of surface) of a polished surface to that of a black body at the same temperature.

The steady state temperature of a radioisotope capsule in a ground abort situation, for example, is determined principally by the emissivity of its surface; the higher the emissivity, the lower the capsule temperature. When noble metal claddings are used for oxidation protection of refractory metals, they degrade at a rate dependent strongly upon temperature. Thus, any reduction in capsule temperature achieved by increasing the emissivity of a noble metal cladding will enhance the capsule ground abort survivability.

SUMMARY OF THE INVENTION

The invention generally relates to a means to increase the total emittance of noble metals. It has been surprisingly found that when alumina, $Al_2O_3$, is modified with a noble metal "black" and plasma arc sprayed on a noble metal, as described above, the total emittance increase over that of the bare noble metal is approximately 250 percent. The invention is comprised of a method to modify alumina with a dispersion of a noble metal black and then to plasma arc spray the modified alumina on the noble metal to provide a high emittance coating.

An object of this invention is to provide a method for applying a high emittance coating of alumina modified with a noble metal black.

Another object of the invention is to provide a method for modifying alumina with a noble metal black.

Still another object of the invention is to provide a high emittance cladding formed of a noble metal having a modified alumina coating.

A further object of the invention is to provide a noble metal coating which retains its ductility after high temperature service in both vacua and air.

A still further object of the invention is to provide a modified alumina, high emittance coating for noble metal substrates in which no chemical interactions occur, and the inherent oxidation resistance of the noble metal substrate remains unaffected by the coating.

Further objects and advantages of the invention may be brought out in the folllowing part of the specification wherein small details have been described for the competence of disclosure, without intending to limit the scope of the invention which is set forth in the appended claims.

BRIEF DESCRIPTION OF THE DRAWINGS

Referring to the accompanying drawings, which are for illustrative purposes.

DESCRIPTION OF THE PREFERRED EMBODIMENT

The inventive process is comprised of modifying alumina with a noble metal black selected from the noble metal group including ruthenium, rhodium, palladium, osmium, iridium and platinum and intra-alloys thereof. The alumina may be modified with a noble metal black in all concentrations such that a substantial quantity of the noble metal remains as a finely dispersed noble metal black after plasma arc spraying the modified alumina on the noble metal substrate. In other words, as long as the noble metal remains in a fine dispersion as a black, it is not in excess in the mixture with the alumina.

For the purpose of the process, the source of the noble metal may be in a soluble form so that it may be put into solution with the alumina. Such noble metal compounds are: chloroplatinic acid, $IrCl_4$, [Rh $(NH_3)_6$] $Cl_3$, $RuCl_4 \cdot 5H_2O$, and $OsCl_3$. An example of the process to synthesize a five weight percent platinum modified (platinized) alumina is as follows:

1. Approximately 147.5 grams of activated alumina, $Al_2O_3$, are added to a beaker of concentrated hydrochloric acid.

2. The concentrated hydrochloric acid and the alumina are boiled for approximately two hours with intermittent stirring.

3. The hot concentrated hydrochloric acid is removed from the alumina, and the alumina is washed with several aliquot portions of distilled water until approximately 5 gallons of water is used.

4. The alumina is removed from the water and dried in air at temperatures ranging from room temperature to 250° F.

5. Approximately 22.58 grams of chloroplatinic acid, $H_2PtCl_6 \cdot 6H_2O$ is dissolved in 250 ml of water, and the dried alumina is added thereto.

6. The chloroplatinic acid and the alumina are blended for 12 hours to 18 hours at room temperature.

7. The temperature is then raised to 90° to 95° C. and the blending is continued for 3 to 4 hours.

8. The alumina is removed and dried in a vacuum oven for 48 to 65 hours at 60° to 65° C.

9. The resulting dried cake of platinized alumina is pulverized and is heated for 3 to 4 hours in flow hydrogen at from 500° to 700° C to remove the hydrogen chloride.

The last step may also be accomplished in still air at 500° C.

Figure 1:
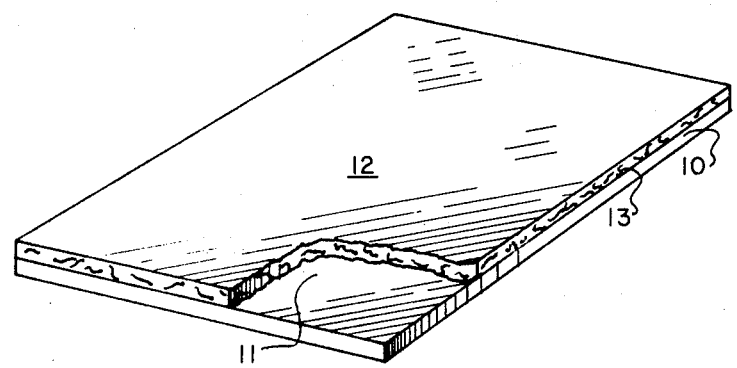
FIG. 1 is an isometric view of a noble metal substrate having a plasma arc sprayed modified alumina high emittance coating thereon.

The noble metal or intra-noble metal alloy substrate is then plasma arc sprayed with the platinized alumina to establish a high emittance coating having a thickness of from 0.003 inch to 0.009 inch. The thickess of the noble metal or alloy used for cladding on radioisotope containment vessels is in the range of from 0.020 inch to 0.100 inch. There is shown in FIG. 1 a substrate in the form of a flat plate 10 of one of the noble metals stated, having diffusion bonded on one side 11, a modified alumina high emittance coating 12, plasma arc sprayed thereon. The diffusion bonding is shown in the irregular surfaces as at 13 where the modified alumina is joined to the noble metal or intra-alloy thereof. This can be generally seen only through high magnification.

Figure 2:
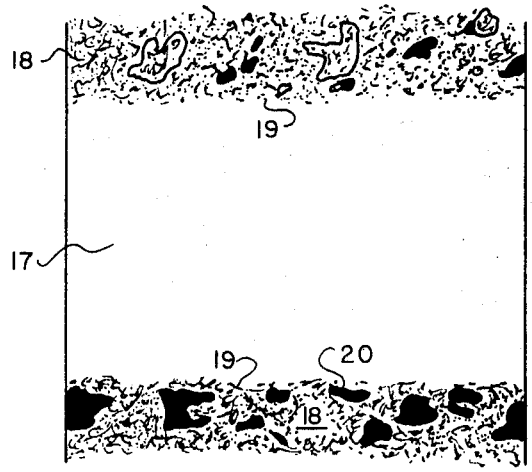
FIG. 2 is a magnified end view of a substrate of a platinum-rhodium alloy having a plasma arc sprayed platinized alumina coating bonded on two opposite surfaces thereof.

In FIG. 2 there is shown a substrate 17 of a platinum-10 weight percent rhodium alloy, having diffusion bonded to opposite sides, a thin layer of plasma arc sprayed platinized alumina 18. The excellent diffusion bonding at 19 between the coating and the noble metal substrate is indicated by the irregular edge penetration of the coating into the noble metal. The drawing in FIG. 2 was made in exact size from a copy of a 200X phtomicrograph. The coating 18 has a dark gray color interspersed with totally black shadows formed in recesses 20 in the coatings.

The pretreatment acid wash described above produces a significant improvement in the emittance of the platinized alumina over alumina which has not been subjected to the pretreatment. Platinized alumina which has been pretreated with the hot hydrochloric acid wash exhibits an emittance in the general range of from about 0.7 to about 0.8, whereas the emittance of the untreated platinized alumina may range from about 0.2 to about 0.7.

Figure 3:
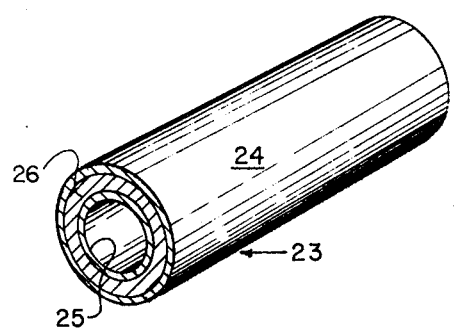
FIG. 3 is an illustration of a noble metal cladding for a refractory metal and having a plasma arc sprayed modified alumina on inner and outer cylindrical surfaces of the cladding in accordance with the invention, the end view thicknesses of the cladding and coatings being substantially exaggerated.

In FIG. 3, there is shown a tube 23, having external and internal modified coatings 24 and 25, respectively, formed upon a noble metal 26, such as that shown in FIGS. 1 and 2. The thickness of the coatings and the noble metals are exaggerated but are shown to illustrate a tubular cladding for use on a refractory metal for containing radioisotopes.

The invention and its attendant advantages will be understood from the foregoing description, and it will be apparent that various changes may be made in the form, construction and arrangement of the parts of the invention without departing from the spirit and scope thereof or sacrificing its material advantages, the arrangement hereinbefore described as being merely by way of example. We do not wish to be restricted to the specific forms shown or uses mentioned, except as defined by the accompanying claims, wherein various portions have been separated for clarity of reading and not for emphasis.

We claim:

1. A method of making a high emittance oxidation resistant cladding comprising:
    a. boiling alumina particles having a size range of from 44–74 microns in concentrated hydrochloric acid;
    b. washing said alumina particles in water;
    c. removing and drying said alumina particles in air;
    d. blending said alumina particles into a dissolved soluble compound of one or more of the noble metals selected from the group consisting of ruthenium, rhodium, palladium, osmium, iridium, and platinum and intra-alloys thereof at room temperature;
    e. heating the solution to approximately 90° C to 95° C;
    f. drying in vacuum at temperatures from approximately 65° C;
    g. pulverizing the formed dried cake of mixed metal and alumina;
    h. heating the dried mixture in a gas selected from the group consisting of air and hydrogen for a period of approximately 3 to 4 hours at temperatures from approximately 500° C to 700° C; and
    i. applying said dried mixture to a substrate of noble metal.

* * * * *